Aug. 6, 1946.    L. B. GLAZE    2,405,251
CLAMPING DEVICE
Filed April 10, 1944
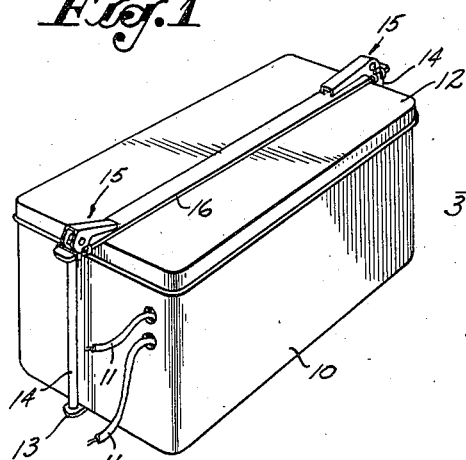
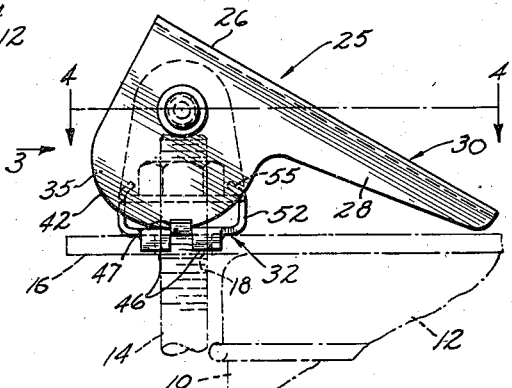
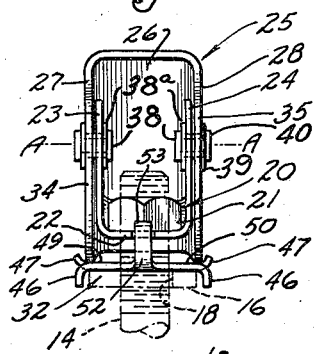
INVENTOR
LEAVITT B. GLAZE
BY
HARRIS, KIECH, FOSTER & HARRIS
FOR THE FIRM
ATTORNEYS Patented Aug. 6, 1946

2,405,251

UNITED STATES PATENT OFFICE 2,405,251

CLAMPING DEVICE

Leavitt B. Glaze, Los Angeles, Calif., assignor to Paul Henry, Los Angeles, Calif.

Application April 10, 1944, Serial No. 530,274

12 Claims. (Cl. 292—256)

My invention relates to a clamping device and, more particularly, to a simple, quick-acting clamp useful for many purposes, particularly where pressure is to be applied at a position adjacent a rod. The invention will be particularly exemplified with reference to its use as a battery hold-down clamp, but it should be clear that it is not limited thereto.

There are many industrial uses for a quick-operating clamping device which can be applied to a rod or other support, and which is designed to apply pressure to an adjacent object. For example, air craft batteries are commonly encased in a box with a removable cover conventionally held in place by a strap extending longitudinally along the cover and cooperating with two studs or rods in such manner that conventional nuts or wing nuts threaded to the rods will press the strap against the cover. Conventional attachment means of this character are open to the objection that they are not quick-acting and often require tools to effect the clamping action. In many instances, they are not vibration-proof and tend to release under conditions of substantial vibration or upon small relative movement between the clamped elements.

It is an object of the present invention to provide a clamping device which requires no tools to effect the desired clamping action; which has a very high mechanical advantage permitting the application of very substantial clamping forces; and which is simple, self-containing, and easy to manufacture and operate. It is a further object of the invention to provide a clamping device which is associatable with a rod and which, when in clamping position, is automatically locked against rotation relative to the rod and relative to the clamped structure. A further object is to provide a clamping device which will not loosen when subject to vibration or relative movement of the clamped elements.

The invention comprehends a rod-receiving structure adjustable in position along an existing rod adjacent a structure to be clamped, with a clamping member pivoted to the rod-receiving structure in such manner that, when turned, this clamping member will apply the desired clamping pressure. The provision of such a structure is within the objects of the invention.

It is a further object of the invention to provide a clamping device including a manually-operable cam means associated with a pressure member movable by the cam means to apply pressure to an adjacent member, such as a strap, extending across a battery box. Other objects lie in the provision of novel means for attaching such a pressure member to the rod-receiving structure for limited movement toward and away therefrom.

It is often desirable to use the clamping device of the invention in combination with a threaded rod, and it is an object to provide a rod-receiving structure threaded to receive the rod so that the entire clamping device can be turned about the axis of the rod to advance same therealong to an operating position adjacent the element to be clamped. It is an object of the invention to provide cam means operable when the clamping device is in such operating position to exert the desired clamping pressure.

Further objects and advantages of the invention will be evident hereinafter from the exemplified disclosure of the invention as applied to the problem of clamping a battery or its cover in position.

Referring to the drawing:

Figure 1 is a perspective view of a battery case with two clamping devices of the invention illustrated in clamped position;

Figure 2 is a side elevational view of the invention in clamped position, with adjacent elements shown by dotted lines;

Figure 3 is an end view of the invention, taken as indicated by the arrow 3 of Figure 2, with the device in clamped position;

Figure 4 is a view partially in section, taken along the line 44 of Figure 2;

Figure 5 is a view similar to Figure 2, showing the clamping device in its operating position preparatory to movement into the clamping position and with the pressure member in an intermediate position somewhat above its lowermost position;

Figure 6 is a side view, taken as indicated by the arrow 6 of Figure 5, with the pressure member in raised position; and Figure 7 is a diagrammatic side view of the clamping member indicating the design of the cam surfaces thereof.

Referring particularly to Figure 1, the numeral 10 indicates a battery box of the type employed in aircraft, with conductors 11 extending from the contained battery and with a cover 12 closing the upper end of the box to retain the battery in position and protect same from accidental contact. A lower structure 13 provides two upwardly-extending rods 14 to which are respectively secured clamping devices 15 of the invention. In the illustrated relationship, the clamping devices apply downward pressure to a strap 16 longitudinally traversing the cover 12. This strap may provide two openings aligned with the rods 14 to receive same but, in the preferred structure, at least one of these openings is in the form of a slot opening on one side of the strap 16, as indicated by the numeral 18 of Figures 3, 5, and 6, thereby permitting the strap 16 to be moved sidewise toward the corresponding rod 14 to center the rod with respect to the strap prepartory to the clamping operation.

The clamping device 15 includes a rod-receiving structure 20 and any suitable means may be provided for adjustably positioning same at various positions along the corresponding rod 14. In the illustrated embodiment, the upper end of this rod is threaded and the rod-receiving structure 20 has a correspondingly-threaded opening provided, for example, by a nut 21. In its preferred embodiment, the rod-receiving structure 20 includes a U-shaped or saddle-like metal structure having a base 22 in contact with the nut 21 and two spaced pivot arms 23 and 24 extending upwardly therefrom. The nut 21 is brazed, welded, or otherwise secured adjacent the bottom of the saddle-like structure, though it is quite clear that other means may be employed for providing a threaded rod-receiving opening without departing from the spirit of the invention.

Straddling the rod-receiving structure 20 is a clamping member, indicated generally by the numeral 25, preferably formed of sheet metal bent into channel shape so as to provide a base portion 26 with sides 27 and 28 extending therefrom. The base portion 26 and the sides 27, 28 extend sidewise from the vicinity of the rod-receiving structure 20 to provide an operating arm 30.

Near the rod-receiving structure 20, the sides 27 and 28 of the clamping member 25 are extended to form a cam means operatively connected to the arm 30 and adapted to engage a pressure member, indicated generally by the numeral 32, to advance same into clamping relationship with the strap 16, as will be later described. The extended sides 27 and 28 thus provide cam members 34 and 35 respectively adjacent the outer surfaces of the pivot arms 23 and 24.

The entire clamping member 25 is pivotally connected to the rod-receiving structure 20 to swing about a pivot axis indicated by the line A—A. Preferably, each cam is separately pivoted to its corresponding pivot arm by a structure best shown in Figure 4. For example, a sleeve 36, preferably slightly longer than the combined thicknesses of the pivot arm 24 and the cam member 35, extends through appropriately-sized sleeve-receiving openings therein. The body of a rivet 37 extends through the sleeve, with a rivet head 38 separated from the pivot arm 24 by a washer 38a, as shown. When thus positioned, a washer 39 is placed around the rivet outside the cam member 35 and the end of the rivet is deformed to form a head 40 retaining the pivot means in position, the clamping member 25 pivoting on the sleeve 36 or being connected to the sleeve so that the journalling action is between the sleeve 36 and the rivet 37. An axially aligned pivot means of similar structure interconnects the pivot arm 23 and the cam member 34.

The cam members 34 and 35 provide identical cam surfaces 42, preferably designed as suggested in Figure 7. As there shown, each cam surface comprises two smoothly intersecting portions B and C, the former being termed an advancing portion and occupying the zone subtended by angle C, being an arc about a point 43 lying directly below the axis A—A when the clamping member is in the position shown in Figure 7. The cam portion C represents a locking portion subtended by angle D and may be concentric with the axis A—A, if desired. However, in the preferred embodiment, the locking portion C is concentric with a point 44 below the axis A—A and slightly to the right thereof. In this manner, the maximum distance between the axis A—A and the cam surface 42 is at the junction of the advancing portion B and the locking portion C when the arm 30 is horizontally disposed. When the arm is advanced additionally in the direction of an arrow 45, the vertical distance between the cam surface and the axis A—A decreases slightly to effect the desirable locking action later described.

The pressure member 32 is in the form of a rectangular plate providing a rod-receiving opening somewhat larger than the rod 14. It is of sufficient width to bridge the strap 16 and each of its sides is inwardly slotted at two positions to provide three tabs. The two end tabs on each side are bent downwardly to form depending tabs 46 spaced to receive the strap 16 and of such length as to extend downwardly at the sides of the strap to terminate just above the lower surface thereof when the clamping device is in clamped position. The intervening central tabs on each side of the pressure member 32 are deformed upwardly to form guide tabs 47 immediately adjacent but beyond cam-engaging surfaces 49 and 50 of the pressure member, and which surfaces are respectively engaged by the cam surfaces 42 of the cam members 34 and 35. Correspondingly, the guide tabs 47 are adjacent the point of contact between the cam surfaces 42 and the pressure member and serve the desirable function of preventing such spreading of the cam members 34 and 35 as might cause them to be displaced sideward from the pressure member 32 and thus out of engagement with the cam-engaging surfaces 49 and 50 thereof.

The pressure member 32 is preferably mounted for limited movement with respect to the rod-receiving structure 20. This is preferably accomplished by use of an attachment means for attaching the pressure member to move toward and away from the base 22 of the rod-receiving structure. In addition, such attachment means should desirably provide means for guiding the pressure member in its motion toward and away from the pivot axis A—A so that it will move in a direction substantially parallel to the axis of the rod, while permitting tipping of the pressure member out of a plane transverse to the rod axis. The preferred attachment means includes a tongue or arm 52 bent upwardly at each end of the pressure member 32 and loosely-slidable in a corresponding notch 53 or other opening at each end of the base 22 of the rod-receiving structure 20. The uppermost end of each arm 52 is bent inwardly toward the nut 21 to form a stop 55 which limits the motion of the pressure member away from the rod-receiving structure 20 when this stop engages the upper surface of the base 22. Such tongue-and-groove means at each end of the pressure member provides for universal movement of the pressure member by tipping in any direction relative to the base 22, yet while preventing unlimited displacement of the pressure member transverse to the axis of the rod either parallel to the longitudinal axis of the strap 16 or in a direction at right angles thereto.

The clamping device of the invention is applied to the rod 14 while the arm 30 is in or near its upright position shown in Figure 5, the pressure member 32 hanging by its arms 52. In this position, the arm 30 lies substantially parallel to the rod 114 and the clamping structure can be turned about the axis of the rod to advance the nut 21 therealong to the operating position, namely, a position at which swinging of the arm 30 toward its position shown in Figure 2 will bring the cam surfaces 42 into the desired pressural engagement with the pressure member 32.

This advancement of the clamping structure along the rod 14 may be effected before or after the strap 16 is in place. In the former instance, the pressure member 32 may be manually lifted to its position shown in Figure 6 after the clamping structure is in its operating position, whereupon the strap 16 can be moved sidewise into encompassing relationship with the rod 14. The pressure member 32 is then released so that its depending tabs 46 lie on opposite sides of the strap 16. If, on the other hand, the strap 16 is already in place during advancement of the clamping structure along the rod 14, the depending tabs 46 of the now-hanging pressure member 32 will tend to engage the strap 16 just before the clamping structure reaches the desired operating position. This can be prevented by manually lifting the pressure member 32 into its position shown in Figure 6 during the subsequent advancement of the clamping structure to its operating position. In addition, the depending tabs 46 may be designed to cause the pressure member 32 to rise and fall automatically twice each revolution of the clamping structure during its subsequent advancement, the tabs 46 engaging the sides of the strap 16 to effect this motion of the pressure member 32.

When the clamping structure is in its operating position, the pressure member 32 is approximately in its intermediate position shown in Figure 5, namely, in such position that turning of the arm 30 toward its position shown in Figure 2 will bring the advancing portion B of the cam surfaces into sliding contact with the cam-engaging surfaces 49 and 50 of the pressure member 32. As the arm 30 is swung toward horizontal position, the pressure member is thus advanced downwardly by portion B of each of the two cam members to press against the strap 16. With the cam design shown in Figure 7, maximum pressure is obtained at the time the arm 30 is in substantially horizontal position or at a position inclined slightly downwardly from such horizontal position. The clamping structure can be left in this position, if desired. However, the cam design in Figure 7 is such that subsequent movement toward the position shown in Figure 2 will "back off" very slightly on the downwardly-applied pressure, permitting the pressure member 32 to rise a minute distance. This tends to exert a force on the clamping member 25 tending to retain it in its position shown in Figure 2 and preventing any tendency for the arm 30 to rise toward its upper or released position.

The maximum clamping action exerted is determined by change in the aforesaid operating position. For example, if the required pressure is not obtained by the cam action when the clamping structure is first advanced to its estimated-correct operating position, the arm 30 is lifted and the clamping structure turned a full revolution (or one-half revolution, if it is permissible to have the arm 30 pointed outward relative to the battery box) to advance same to a new operating position, after which the arm 30 is again swung into its position shown in Figure 2 to effect the desired cam-induced clamping action.

It will be apparent that, when the clamping device is in its position shown in Figure 2, it is locked against rotation on the rod 14 because the depending tabs 46 prevent relative rotation between the pressure member 32 and the strap 16 and because the arms 52 of the attachment means prevent rotation of the rod-receiving structure relative to the pressure member 32. It will be apparent, also, that the device, when in the clamping position shown in Figure 2, is locked against release by vibration or small relative movement of the clamped elements. The cam design shown in Figure 7 is particularly desirable in this latter connection, though it should be apparent that the invention is not limited thereto and can employ spiral-shaped cam surfaces so that the maximum clamping action is obtained when the arm is in its position shown in Figure 2.

To release the clamping structure, it is only necessary to lift the arm 30 to its upright or released position suggested in Figure 5, whereupon the strap 16 can be moved sidewise from the vicinity of the rod 14 and the cover 12 lifted from the container 10.

Various changes and modifications can be made without departing from the spirit of the invention as defined in the appended claims.

I claim as my invention:

1. In a clamping device for attachment to a rod, the combination of: a rod-receiving structure adjustable in position along said rod; a pressure member; means apart from said rod for attaching said pressure member to said rod-receiving structure for limited movement toward and away from said rod-receiving structure; an arm; means for pivoting said arm to swing relative to said rod-receiving structure; and cam means operatively connected to said arm and engaging said pressure member when said arm is pivoted relative to said rod-receiving structure to advance said pressure member in a direction away from said pivot means.

2. A combination as defined in claim 1, in which said rod is threaded and in which said rod-receiving structure contains a threaded opening receiving said rod, said arm being pivotable from a releasing position substantially in alignment with said threaded opening at which position said cam means pressurally disengages said pressure member to permit free movement of said pressure member as limited by said attaching means to a clamping position at which said cam means pressurally engages said pressure member.

3. In a clamping device for attachment to a rod, the combination of: a rod-receiving structure adjustable in position along said rod and providing two spaced pivot arms providing outer surfaces; a pair of cam members respectively disposed adjacent said outer surfaces; means for pivoting said cam members to said arms to move about a pivot axis, said cam members providing cam surfaces; means for attaching said cam members together to turn about said pivot axis; a movable pressure member adjacent said rod-receiving structure and providing cam-engaging surfaces spaced to be contacted respectively by said cam surfaces when said attached cam members are turned about said pivot axis, said cam surfaces being shaped to move said pressure member away from said pivot axis upon such turning of said cam members; and means apart from said rod and interconnecting said pressure member and said structure for guiding said pressure member in its motion away from said pivot axis to move in a direction substantially parallel to said rod.

4. A combination as defined in claim 3, in which said last-named means includes means for attaching said pressure member to said rod-receiving structure for limited movement toward and away from said rod-receiving structure.

5. In a clamping device for attachment to a rod, the combination of: a rod-receiving structure adjustable along said rod and providing a base member; a pressure member; means for attaching said pressure member to said rod-receiving structure for limited movement toward and away from said rod-receiving structure, said means including a pair of projections on one of said members and a corresponding pair of openings in the other of said members slidably receiving said projections, said projections providing stop means for limiting the motion of said projections in said openings; and cam means pivoted to said rod-receiving structure and engaging said pressure member to advance same in a direction away from said base member within the limits of motion of said pressure member permitted by said attachment means.

6. A clamping device for attachment to a rod to apply pressure to a strap extending substantially at right angles to said rod, said clamping device including in combination: a rod-receiving structure adjustable in position along said rod; a pressure member disposed below said rod-receiving structure and of sufficient width to bridge said strap, said pressure member providing depending tabs spaced a sufficient distance to extend on opposite sides of said strap; an arm; means for pivoting said arm to swing relative to said rod-receiving structure; and cam means operatively connected to said arm and engaging said pressure member to exert a downward force on said pressure member tending to press same against said strap when said arm is pivoted relative to said rod-receiving structure.

7. A clamping device for attachment to a rod, including in combination: a U-shaped structure including a base and two pivot arms, said base having a rod-receiving opening; a pair of cam members pivoted to said pivot arms to swing about a pivot axis, said cam members providing cam surfaces; means for interconnecting said cam members to move together about said pivot axis; a pressure member providing cam-engaging surfaces disposed to be contacted respectively by the cam surfaces of said cam members; and attachment means apart from said rod for attaching said pressure member to said base, said attachment means including means to limit movement of said pressure member toward and away from said base.

8. A combination as defined in claim 7, in which said base has an opening therein, and a nut secured to said U-shaped structure between said pivot arms, said nut having a threaded opening axially aligned with said opening of said base and adapted to receive said rod.

9. A clamping device, including in combination: a U-shaped structure including a base and two pivot arms; a channel-shaped clamping member having a base portion and sides extending therefrom to form cam members outside said U-shaped structure and respectively extending parallel to said pivot arms, said cam members respectively providing cam surfaces and said clamping member providing an operating arm; means for pivoting said clamping member relative to said pivot arms to swing about a pivot axis; a pressure member adjacent said base of said U-shaped structure and providing cam-engaging surfaces spaced to be contacted respectively by said cam surfaces when said clamping member is turned about said pivot axis; a tab formed on each side of said pressure member outside the respective cam-engaging surface, each tab being bent upwardly to form a guide means preventing sidewise movement of the adjacent cam-member from its cam-engaging surface; and attachment means for attaching said pressure member to said base of said U-shaped structure for limited movement of said pressure member toward and away from said base.

10. In a clamping device for attachment to a threaded rod to apply pressure to a strap extending substantially at right angles to said rod, said clamping device including in combination: a U-shaped rod-receiving structure including a base, two pivot arms extending upwardly therefrom, and a nut secured between said pivot arms and adapted to receive said threaded rod; a clamping member including two cam members extending outside and parallel to said pivot arms, said cam members providing cam surfaces; a pair of pivot means for pivoting said cam members respectively to their adjacent pivot arms in such manner that said cam members move together about a pivot axis substantially at right angles to the axis of said rod; a pressure member below said base of said rod-receiving structure, said pressure member providing a rod-receiving opening, two cam-engaging surfaces disposed to be contacted respectively by the cam surfaces of said cam members, the sides of said pressure member being slotted to provide a plurality of tabs, one tab on each side of said pressure member being outside the adjacent cam-engaging surface and being bent upwardly to form a guide mean preventing sidewise movement of the adjacent cam member from its cam-engaging surface, the remaining tabs on each side of said pressure member being bent downward to form depending tabs spaced to extend downwardly on opposite sides of said strap; and attachment means for attaching said pressure member to said base for limited movement in a direction toward and away from said base.

11. In a clamping device for attachment to a rod, the combination of: a rod-receiving structure adjustable in position along said rod and providing two spaced pivot arms providing outer surfaces; a pair of cam members respectively disposed adjacent said outer surfaces; means for pivoting said cam members to said arms to move about a pivot axis, said cam members providing cam surfaces; means for attaching said cam members together to turn about said pivot axis; a movable pressure member adjacent said rod receiving structure and providing cam-engaging surfaces spaced to be contacted respectively by said cam surfaces when said attached cam members are turned about said pivot axis, said cam surfaces being shaped to move said pressure member away from said pivot axis upon such turning of said cam members; and guide means provided on said pressure member adjacent said cam engaging surfaces for preventing slippage of said cam surfaces from said cam engaging surfaces.

12. A clamping device, including in combination: a U-shaped structure including a base and two pivot arms; a channel-shaped clamping member having a base portion and sides extending therefrom to form cam members outside said U-shaped structure and respectively extending parallel to said pivot arms, said cam members respectively providing cam surfaces and said clamping member providing an operating arm; means for pivoting said clamping member relative to said pivot arms to swing about a pivot axis; a pressure member adjacent said base of said U-shaped structure and providing cam-engaging surfaces spaced to be contacted respectively by said cam surfaces when said clamping member is turned about said pivot axis; and attachment means for attaching said pressure member to said base of said U-shaped structure for limited movement of said pressure member toward and away from said base, said attaching means including upwardly-extending projections each providing a stop means, said base of said U-shaped structure having a pair of openings loosely receiving said projections, and said stop means being disposed above said base to limit downward motion of said pressure member relative to said base.

LEAVITT B. GLAZE.